(12) United States Patent
Mizuno et al.

(10) Patent No.: US 6,455,145 B1
(45) Date of Patent: *Sep. 24, 2002

(54) FRICTION MEMBER

(75) Inventors: Masahito Mizuno, Tajimi (JP); Osamu Shimase, Aichi-gun (JP); Katsumi Uemura, Nagoya (JP); Satoshi Narazaki, Toyota (JP)

(73) Assignees: Aisin Kako Kabushiki Kaisha, Nishikamo-gun (JP); Aisin Seiki Kabushiki Kaisha, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/266,787

(22) Filed: Mar. 12, 1999

(30) Foreign Application Priority Data

Mar. 17, 1998 (JP) .......................................... 10-067303
Oct. 8, 1998 (JP) .......................................... 10-286997

(51) Int. Cl.$^7$ ................................................. C09K 3/14
(52) U.S. Cl. ............... 428/311.11; 428/141; 428/304.4; 428/311.51; 428/312.2; 428/312.8; 192/107 M; 188/73.1; 188/251 R; 523/149; 523/152; 523/153

(58) Field of Search ................................. 428/141, 131, 428/137, 304.4, 311.11, 311.51, 312.2, 312.8, 315.5, 317.1; 188/73.1, 251 R; 192/107 M; 523/149, 152, 153

(56) References Cited

U.S. PATENT DOCUMENTS 5,753,356 A * 5/1998 Lam et al. ................... 428/283
5,817,411 A * 10/1998 Nakajima ................... 428/334

FOREIGN PATENT DOCUMENTS

| JP | 4-159385 | | 6/1992 |
| JP | 4-216892 | | 8/1992 |
| JP | 05247442 A | * | 9/1993 |
| JP | 05247443 A | * | 9/1993 |

* cited by examiner

*Primary Examiner*—Blaine Copenheaver
*Assistant Examiner*—Alicia Chevalier
(74) *Attorney, Agent, or Firm*—Oblon, Spivak, McClelland, Maier & Neustadt, P.C.

(57) ABSTRACT

This invention intends to provide a friction member which is high in an anti-fading character and low in mate attacking character. For such purpose, in a friction member composed of a fiber containing substrate, a bonding agent and a filling agent, an accumulated blow hole rate of blow holes having hole diameter not less than 3.5 μm is selected to be not larger than 2 volume %, and an accumulated blow hole rate of blow holes having hole diameter from 0 to 3.5 μm is selected to be not less than 3 volume %.

3 Claims, No Drawings

FRICTION MEMBER

BACKGROUND OF THE INVENTION

1. Field of the Invention

This invention relates to a friction member to be used for a brake pad of a vehicle and the like.

2. Description of the Related Art

Conventionally, for a friction member to be used for a brake pad of a vehicle, various properties such that it has large braking force and is excellent in anti-wearing character, braking force of it is hardly changed even by change of temperature and pressure and is stable (anti-fading character), and it is not invaded by a water and an oil and has large material strength, are required.

As a friction member which can relatively satisfy above requirements, the friction member composed of a fiber-like substrate, bonding agent and a filling agent has been widely used. This friction member has blow holes of 10 to 20 volume %, and various sizes of blow holes from 0.01 μm to few tens of microns are distributed in the friction member. Corresponding to high qualification of the vehicle such as high speed, it is required for the friction member to improve the anti-fading character and to reduce attacking character to a mating member i.e. rotor (referred as "mate attacking character" hereinafter) for preventing brake vibration.

Generally, the anti-fading character and the mate attacking character are contradictory to each other, in other words, the friction member excellent in the anti-fading character has high mate attacking character, and the friction member low in the mate attacking character does not have sufficient anti-fading character. That is to say, in the conventional friction member excellent in the anti-fading character, gas generated in a resin component of the friction member upon fading is escaped into the relatively large size blow holes in the friction member having hole diameter larger than 1 μm to thereby increase the anti-fading character. However, worn powders generated due to friction between the pad and rotor when the wheel is rotating idly may be held in those blow holes of large size to operate as a grinding particles, so that the rotor is worn.

In view of the above, in the friction pad in which hole rate of the blow holes having hole diameter equal to or larger than 3 μm is decreased to restrict the mate attacking character, by taking relation between the blow hole rate and hole diameter of the whole friction member into consideration, large numbers of smaller blow holes from 0.1 to 0.5 μm are formed. However, such friction pad can not maintain predetermined anti-fading character in a mounting road sports travelling such as rally travelling, although it can maintain the anti-fading character in the normal travelling.

SUMMARY OF THE INVENTION

The present invention is made, in view of the above circumstances, and intends to provide the friction member which is excellent in the anti-fading character, but is low in the mate attacking character.

In order to overcome the above mentioned disadvantage, inventors of the present application has studied about the blow hole rate of the friction member to find out the fact that decreasing the numbers of the large diameter blow holes which may hold the friction powders therein and increasing an accumulated blow hole rate of blow holes having hole size which can escape gas generated upon fading are effective for solution of the problem. Here, "blow hole rate" means the rate of void portion of the blow holes relative to an artificial whole volume of the friction member and is expressed by volume %.

The present invention is featured by that in the friction member composed of the fiber-like substrate, bonding material or agent, and filling material or agent, an accumulated blow hole rate of the blow holes having hole diameter equal to or more than (not less than) 3.5 μm is selected to be not larger than 2 volume %, and an accumulated blow hole rate of the blow holes having hole diameter from 0.5 to 3.5 μm is selected to be not less than 3 volume %. Here, the significance of the above critical values (2 volume % and 3, 5 volume %) will be explained. If the accumulated blow hole rate of the blow holes having hole diameter not less than 3.5 μm increases over 2 volume %, the mate attacking character of the friction member will be also increased, whereas if the accumulated blow hole rate of the blow holes having hole diameter from 0.5 to 3.5 μm decreases below 3 volume %, the anti-fading character will be also decreased.

In the present invention, at a part or portion of the friction member located between a surface and a point of 8 mm depth in thickness direction, it is preferable that an accumulated blow hole rate of the blow holes having hole diameter equal to or more than (not less than) 3.5 μm is selected to be not larger than 2 volume %, and an accumulated blow hole rate of the blow holes having hole diameter from 0.5 to 3.5 μm is selected to be not less than 3 volume %. That is to say, provision or distribution of the blow holes satisfying the above volume % in the part of friction member located from the surface to the point of 8 mm, depth will facilitate escapement of the gas generated upon fading sufficiently. The blow hole rate is controlled by adjusting a forming time and a forming temperature in a heat forming of the friction member.

For the bonding agent, a phenol resin, epoxy resin or polyimide resin which has been used in the conventional friction member can be used, like wisely.

For the filling agent, organic and inorganic lubricating agent and filling agent which have been used in the conventional friction member can be used. They are, for example, carbon black, graphite, barium sulfate, calcium carbonate, silica, rubber particles, or cashew dust.

It is preferable for the surface of friction member to be subjected to a scorch treatment. Here "scorch treatment" is the treatment in which a friction surface is baked in advance to prevent occurrence of the fade due to resolved gas generated from the organic substrate contained in the friction member. The friction surface subjected to the scorch treatment has larger blow hole rate than an inner portion not subjected to the scorch treatment to allow gas escapement.

The scorch treatment is performed over the portion of the friction member located from 2 to 4 mm from the friction surface. In a portion located from 2 to 8 mm from the friction surface and not subjected to the scorch treatment, it is preferable to select the accumulated blow hole rate of the blow holes having hole diameter not less than 3.5 μm to be not more than 2 volume %, and to select the accumulated blow hole rate of the blow holes having hole diameter from 0.5 to 3.5 μm to be not smaller than 3 volume %.

It is enough for the friction member that only the portion located 2 to 4 mm depth from the friction surface is subjected to the scorch treatment, because the portion located 2 to 8 mm depth from the friction surface and not subjected to the scorch treatment will be sequentially subjected to the scorch treatment by baking of the friction member due to heat of the hard braking under travelling, while the friction surface subjected to the scorch treatment is worn.

The fiber-like substrate preferably includes a metallic fiber and an inorganic fiber by the rate not less than 25 wt %, when the friction member is assumed to have 100 wt %. The metallic fiber and inorganic fiber form and maintain framework in the friction member so that the blow holes formed therein are not collapsed. For this reason, if rate of the inorganic fiber is smaller than 25 wt %, the blow holes in the friction member are collapsed to reduce the rate of void holes, so that anti-fading character of the friction member is decreased.

For the metallic fiber, a steel fiber, stainless steel fiber, titanic or copper fiber can be used, and for the inorganic fiber, a rock wool, glass fiber, silicate fiber, aluminum fiber, carbonate fiber, calcium silicate fiber or potassium titanate fiber can be used.

The fiber-like substrate preferably contains, in addition to the metallic fiber and inorganic fiber of not less than 25 wt %, an organic fiber such as flax, cotton or aromatic polyamide fiber. In other words, it is enough for the substrate to contain the metallic fiber and the inorganic fiber by not less than 25 wt %, which enables to contain the organic fiber other than above two kinds of the fibers.

The friction member can be manufactured by the normal manufacturing method thereof. That is to say, raw materials such as the fiber-like substrate, bonding agent and filling agent are sufficiently mixed in the predetermined rate, then formed into the predetermined shape by the heat forming, and then subjected to the heat treatment.

According to the friction member of present invention, not only the mate attacking character is maintained low by reducing the number of blow-holes into which the friction powders are held, but the anti-fading character is maintained high by increasing the number blow holes which allow gas generated upon fading to escape. Further, on account of the metallic fiber and the inorganic fiber mixed into the friction member the blow holes are hardly collapsed so that the low mate attacking character and high anti-fading character can be maintained.

Preferred Embodiment of the Invention

Next, preferred embodiments of the present invention will be explained.

Here, a brake pad made of the friction member according to the present invention is manufactured. In detail, the brake pad is manufactured by mixing the raw material powders adjusted by the ratio shown in the Table 1 and is poured into a mold cavity to be subjected to the heat forming under the condition shown in the Table 1, and then subjected to the heat treatment under 200 to 300° C. Here, the metallic fiber and inorganic fiber used in the friction member have composition described in the Table 2. The compositions in the Tables 1 and 2 are shown by wt % in the friction member.

Among the friction pads of the embodiments 1 to 6 in the Tables 1 and 2, only the pads of the embodiments 5 and 6 are subjected to the scorch treatment, by pressing the pads onto an iron plate heated up to 500 to 700° C. during 1 to 5 minutes. By such process, the scorch treatment is performed for the portion located between 2 and 3 mm from the friction surface.

Among the pad blow holes of each embodiment, the rates of blow holes having hole diameter from 0.5 to 3.5 μm and hole diameter not less than 3.5 μm are measured, the result of which is shown in the Table 3. Here, since the friction pads of the embodiments 1 to 4 are not subjected to the scorch treatment and is homogeneous, the portion located between the surface and the point of depth 4 mm is assumed as the friction pad surface. Then, the rate of void portion of the blow hole of the friction pad surface relative to the artificial whole volume is measured at the frictional pad surface.

The friction pad of the embodiments 5 and 6 are subject to the scorch treatment at the pad surface, so the scorched portion is assumed as the friction pad surface. Then, the rate of the void portion of the blow hole at the friction pad surface relative to the artificial whole volume, and the rate of the portion located between 2 mm and 8 mm from the pad surface and is not subjected to the scorch treatment relative to the artificial whole volume is measured at the void portions of the blow hole on the friction pad surface.

For the measurement of blow hole rate of the friction pad, a mercury Poroshi meter is used, in which the blow hole rate is calculated by amount of the mercury pressed into the blow holes.

TABLE 1

| Specimen | Aromatic polyamide fiber | Inorganic fiber and Metallic fiber | Phenolic resin | Graphite | Cashew dust | Silica | Barium sulfate | Heating time (° C.) | Pressuring force (Mpa) | Pressuring time (min) |
|---|---|---|---|---|---|---|---|---|---|---|
| Embodiment 1 | 5 | 25 | 10 | 5 | 10 | 5 | 40 | 160 | 30 | 5 |
| Embodiment 2 | 5 | 25 | 10 | 5 | 10 | 5 | 40 | 160 | 30 | 8 |
| Embodiment 3 | 5 | 30 | 10 | 5 | 10 | 5 | 35 | 160 | 25 | 8 |
| Embodiment 4 | 5 | 30 | 10 | 5 | 10 | 5 | 35 | 160 | 20 | 10 |
| Embodiment 5 | 5 | 25 | 10 | 5 | 10 | 5 | 40 | 160 | 25 | 8 |
| Embodiment 6 | 5 | 25 | 10 | 5 | 10 | 5 | 40 | 160 | 25 | 5 |
| Comparative | 5 | 25 | 10 | 5 | 10 | 5 | 40 | 160 | 35 | 5 |

TABLE 1-continued

| Specimen | Aromatic polyamide fiber | Inorganic fiber and Metallic fiber | Phenolic resin | Graphite | Cashew dust | Silica | Barium sulfate | Heating time (° C.) | Pressuring force (Mpa) | Pressuring time (min) |
|---|---|---|---|---|---|---|---|---|---|---|
| Sample 1 | | | | | | | | | | |
| Comparative Sample 2 | 5 | 25 | 10 | 5 | 10 | 5 | 40 | 160 | 30 | 3 |
| Comparative Sample 3 | 5 | 25 | 10 | 5 | 10 | 5 | 40 | 160 | 25 | 3 |
| Comparative Sample 4 | 5 | 20 | 10 | 5 | 10 | 5 | 45 | 160 | 25 | 8 |

TABLE 2

| | Metallic fiber and Inorganic fiber | | | |
|---|---|---|---|---|
| Specimen | Titanate potassium fiber | Steel fiber | Ceramics fiber (silica, alumina) | Silicate calcium fiber |
| Embodiment 1 | 10 | 10 | 5 | 0 |
| Embodiment 2 | 10 | 10 | 5 | 0 |
| Embodiment 3 | 10 | 10 | 5 | 5 |
| Embodiment 4 | 10 | 10 | 5 | 5 |
| Embodiment 5 | 10 | 10 | 5 | 0 |
| Embodiment 6 | 10 | 10 | 5 | 0 |
| Comparative Sample 1 | 10 | 10 | 5 | 0 |
| Comparative Sample 2 | 10 | 10 | 5 | 0 |
| Comparative Sample 3 | 10 | 10 | 5 | 0 |
| Comparative Sample 4 | 8 | 7 | 5 | 0 | from 0.5 to 3.5 μm, the comparative sample 2 is large in the accumulated blow hole rate of the blow hole having hole diameter of 3.5 μm, comparative sample 3 is large in the accumulated blow hole rate of the blow hole having hole diameter not less than 3.5 μm at the portion located between 2 and 8 mm depth from the friction surface which is subjected to the scorch treatment, and comparative sample 4 is small in the mixed rate of the inorganic fiber and the metallic fiber contained in the friction member.

(Evaluation)

The embodiments 1 to 4 are evaluated by measuring the minimum friction coefficient (Min. μ) and rotor worn amount, in the anti-fading test carried out by using the brake dynamo testing machine.

(Measurement of the Min. μ)

Min. μ is measured in the test in which the braking for speed-reducing from 100 km/h to 0 km/h is carried out ten times. In these tests, the speed-reducing degree is 0.9G, the temperature prior to braking (IBT) is 80° C., and braking

TABLE 3

| | Friction pad surface | | Portion located by 2 to 8 mm from friction pad surface and not subjected to scorch treatment | | |
|---|---|---|---|---|---|
| Specimen | Accumulated blow hole rate of hole diameter from 0.5 to 3.5 μm (volume %) | Blow hole rate of hole diameter not less than 3.5 μm (volume %) | Accumulated blow hole rate of hole diameter from 0.5 to 3.5 μm (volume %) | Blow hole rate of hole diameter not less than 3.5 μm (volume %) | Scorch treatment |
| Embodiment 1 | 3 | 2 | — | — | No |
| Embodiment 2 | 3 | 1 | — | — | No |
| Embodiment 3 | 6 | 2 | — | — | No |
| Embodiment 4 | 8 | 0.5 | — | — | No |
| Embodiment 5 | 12 | 2 | 4 | 1 | Performed |
| Embodiment 6 | 12 | 3 | 4 | 2 | Performed |
| Comparative Sample 1 | 2 | 1 | — | — | No |
| Comparative Sample 2 | 4 | 3 | — | — | No |
| Comparative Sample 3 | 13 | 4 | 4 | 3 | Performed |
| Comparative Sample 4 | 6 | 2 | — | — | No |

Further, comparative samples 1 to 4 are manufactured corresponding to the above embodiments 1 to 4, in the similar but slightly different conditions, as shown in the Tables 1 and 2. For the comparative sample 3, same scorch treatment as that of the embodiments 5 and 6 is performed, and the blow hole rate is measured for all of the comparative samples 1 to 4, results of which are shown in the Table 3.

Here, the comparative sample 1 is small in the accumulated blow hole rate of the blow hole having hole diameter interval is 22 seconds. This test is carried out by using the caliper of PD51-18V under mass inertia (inertia) of 5 Kgfms².

(Measurement of Rotor Worn Amount)

Measurement of the rotor worn amount is carried out by measuring reduced amount of the rotor thickness after the braking for speed-reducing from 65 Km/h to 0 Km/h are repeated by 250 times. The speed-reducing degree is 0.35 G, and IBT is 120° C. This test is carried out by using the caliper of PD51-18V and conventional rotor under inertia of 4 Kgfms².

The measured Min. $\mu$ and rotor worn amount are shown in the Table 4 together with the evaluation thereto. As the standard, it is evaluated good or satisfactory (o) when the value of Min. $\mu$ is over than 0.2, but is bad or unsatisfactory (x) when the value is below 0.2; it is evaluated good (o) when the rotor worn amount is below 6 $\mu$m, but bad (x) when the worn amount is over 0.6 m.

TABLE 4

| Specimen | Min. Friction coefficient | | Rotor worn amount | |
|---|---|---|---|---|
| | (Min $\mu$) | Judgement | ($\mu$m) | Judgement |
| Embodiment 1 | 0.22 | o | 4 | o |
| Embodiment 2 | 0.22 | o | 3 | o |
| Embodiment 3 | 0.25 | o | 4 | o |
| Embodiment 4 | 0.28 | o | 2 | o |
| Embodiment 5 | 0.32 | o | 3 | o |
| Embodiment 6 | 0.32 | o | 4 | o |
| Comparative Sample 1 | 0.18 | x | 3 | o |
| Comparative Sample 2 | 0.23 | o | 10 | x |
| Comparative Sample 3 | 0.33 | o | 15 | x |
| Comparative Sample 4 | 0.18 | x | 3 | o |

As apparent from the Table 4, all of the pads of the embodiments 1 to 6 have the Min. $\mu$ over than 0.20 and are satisfactory as the friction member, and the rotor worn amount (below 5 $\mu$m) is sufficiently low to prevent so that the mate attacking character. To the contrary, in the comparative sample 1, the blow hole rate of the blow holes having the hole diameter from 0.5 to 3.5 $\mu$m is small, so that the Min. $\mu$ is reduced and the anti-fading character is deteriorated. In the comparative samples of 2 and 3, since the accumulated blow hole rate of the blow hole having the hole diameter not less than 3.5 $\mu$m is large, the mate attacking character is large. In the comparative sample 4 in which the mixing amount of the metallic fiber and inorganic fiber are small (20 weight %), the blow holes on the pad friction surface are collapsed so that the blow hole rate and the anti-fading character are reduced and deteriorated.

What is claimed is:

1. A friction member having a friction surface, said member comprising
    a fiber-containing substrate;
    a bonding agent; and
    a filling agent,
    wherein, in a portion of said friction member from the friction surface thereof and extending to 8 mm in depth, an accumulated blow hole rate of blow holes having a hole diameter not less than 3.5 $\mu$m is selected to be not larger than 2 volume %, and an accumulated blow hole rate of blow holes having a hole diameter of from 0.5 to 3.5 $\mu$m is selected to be not less than 3 volume %, and
    wherein said fiber-containing substrate contains a metallic fiber and an inorganic fiber in an amount of not less than 25 weight % of the weight of said friction member.

2. A friction member having a friction surface, said member comprising:
    a fiber-containing substrate;
    a bonding agent; and
    a filling agent,
    wherein, in a portion of said friction member from the friction surface thereof and extending to 8 mm in depth, an accumulated blow hole rate of blow holes having a hole diameter of not less than 3.5 $\mu$m is selected to be not larger than 2 volume %, and an accumulated blow hole rate of blow holes having a hole diameter of from 0.5 to 3.5 $\mu$m is selected to be not less than 3 volume %, and
    wherein said fiber-containing substrate contains a metallic fiber and an inorganic fiber in an amount of not less than 25 weight % of the weight of said friction member,
    wherein a scorch treatment is performed at least on the friction surface, and
    wherein the scorch treatment is performed for the portion of said friction member beginning from the friction surface and extending to a depth of from 2 to 4 mm from the friction surface, and at the portion of said friction member beginning from the friction surface and extending to a depth of from 2 to 8 mm from the friction surface and not subjected to the scorch treatment, the accumulated blow hole rate of the flow holes having hole diameter not less than 3.5 $\mu$m is selected to be not larger than 2 volume %, and the accumulated blow hole rate of the blow holes having hole diameter from 0.5 to 3.5 $\mu$m is selected to be not less than 3 volume %.

3. A friction member having a friction surface, said member comprising:
    a fiber-containing substrate;
    a bonding agent; and
    a filling agent,
    wherein, in a portion of said friction member from the friction surface thereof and extending to 8 mm in depth, an accumulated blow hole rate of blow holes having a hole diameter of not less than 3.5 $\mu$m is selected to be not larger than 2 volume %, and an accumulated blow hole rate of blow holes having hole diameter from 0.5 to 3.5 $\mu$m is from 6 to 12 volume %.

* * * * *